Nov. 11, 1947.                H. F. PEARSON                2,430,616
                          INSTRUMENT LENS AND DIAL
                            Filed Aug. 6, 1945
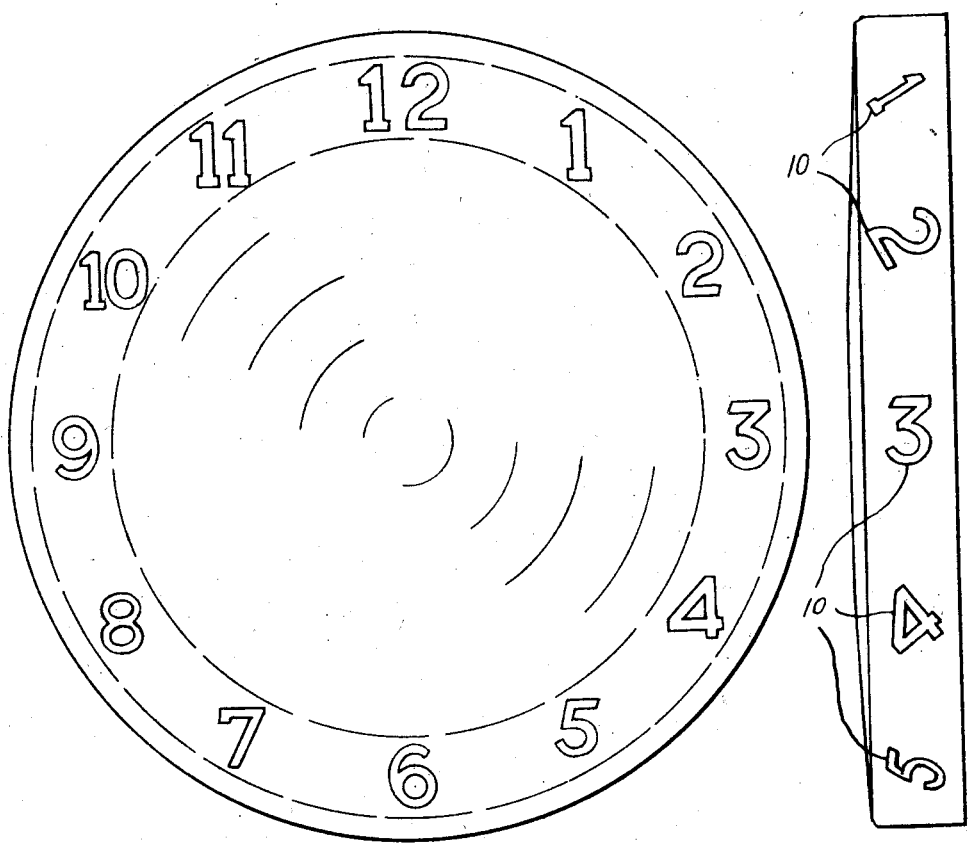
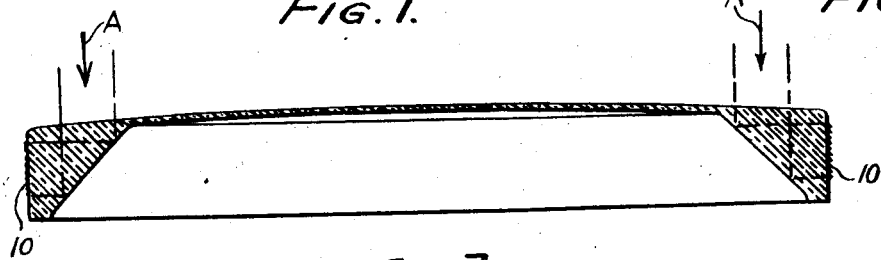
INVENTOR
Henry F. Pearson
BY
ATTORNEY.
WITNESS:

Patented Nov. 11, 1947

2,430,616

UNITED STATES PATENT OFFICE 2,430,616

INSTRUMENT LENS AND DIAL

Henry F. Pearson, Langhorne, Pa., assignor to Röhm & Haas Company, Philadelphia, Pa., a corporation of Delaware Application August 6, 1945, Serial No. 609,192

1 Claim. (Cl. 40—130)

The present invention relates to a lens for an instrument such as clocks, watches, or the like, which serves both as a cover and as a dial.

In accordance with this invention, there is provided a lens of transparent material, such as glass or transparent plastic, for instance, a polymerized acrylic, having about its periphery an enlarged portion in the form of a prism. Indicia are placed about the outer side of the enlarged prismatic portion of the lens and are reflected on the hypothenuse of the prism so that when the lens is viewed from the front the indicia appear upon its face.

Further details respecting the invention will be evident from the accompanying drawing and description, wherein there is disclosed an illustrative embodiment thereof.

In the drawing, Fig. 1 represents a front view of a lens showing indicia as they appear by reflection; Fig. 2 is an end view of the lens, looking from the right of Fig. 1 and showing indicia 10 placed along its outer edge; and Fig. 3 is a cross-section of the lens taken on a center line, indicating how indicia 10 on the edge are reflected by the hypothenuse of the circumferential prismatic portion so that they are made to appear, when viewed in the direction indicated by the arrows A and A', as indicated in Fig. 1 when the lens is viewed from the front.

I claim:

A lens having a face with front and rear surfaces and having about its periphery a prism extending from its rear surface, a portion of the face forming one side of the prism, a second side of the prism extending substantially perpendicular to the face, and the hypothenuse of the prism extending inwardly toward the rear surface, the perpendicular side of the prism having indicia thereupon.

HENRY F. PEARSON.

REFERENCES CITED

The following references are of record in the file of this patent:

UNITED STATES PATENTS

| Number | Name | Date |
|---|---|---|
| 2,173,316 | Sproule | Sept. 19, 1939 |
| 2,223,059 | Donley | Nov. 26, 1940 |
| 2,159,095 | Madan | May 23, 1939 |

FOREIGN PATENTS

| Number | Country | Date |
|---|---|---|
| 20,008 | Great Britain | Sept. 16, 1904 |
| 11,112 | Great Britain | May 11, 1909 |
| 816,795 | France | May 10, 1937 |